May 6, 1969　　　H. W. GOODMAN　　　3,442,015
RIGIDLY MOUNTED REMOVABLE FIXED BRIDGE
Filed July 25, 1966　　　　　　　　　　　Sheet 3 of 4
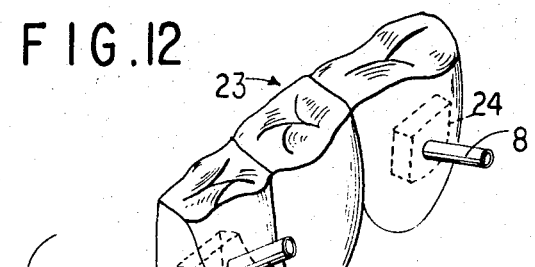
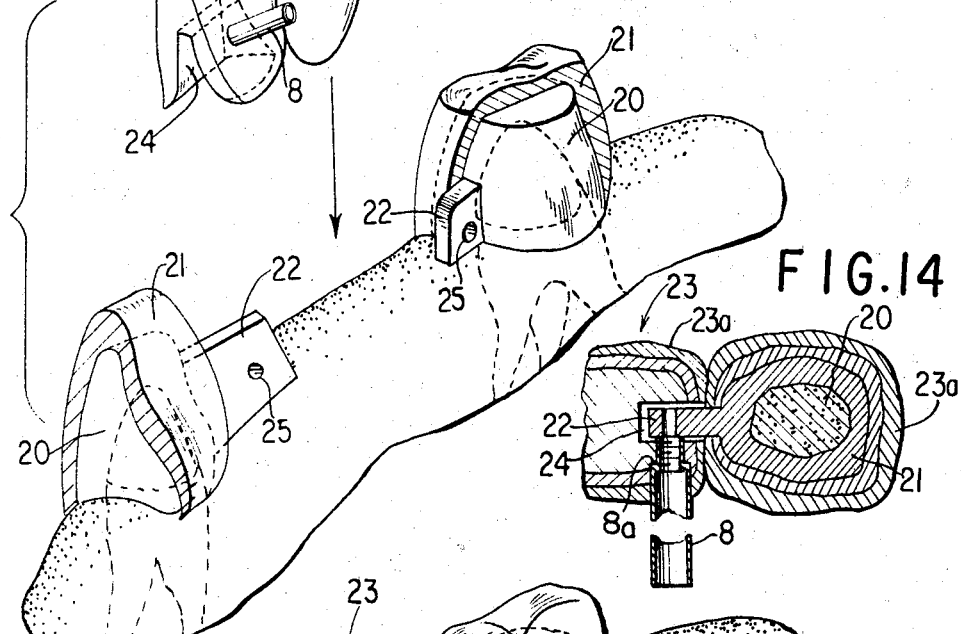
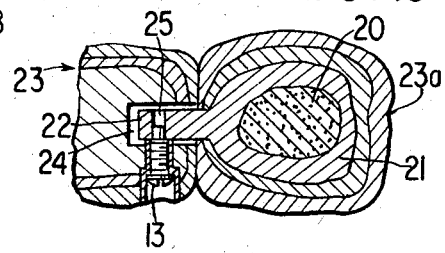
INVENTOR
HERMAN W. GOODMAN
BY
ATTORNEYS United States Patent Office 3,442,015
Patented May 6, 1969

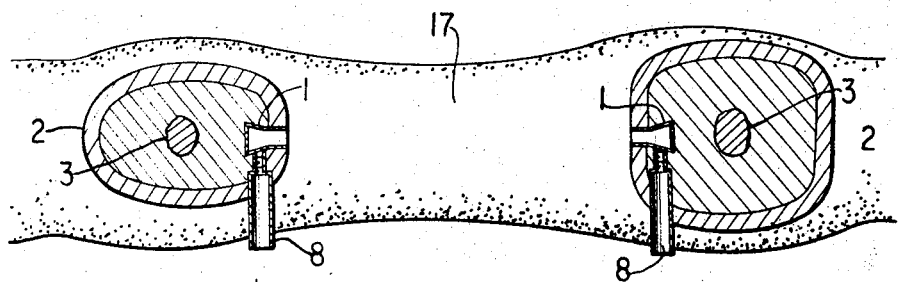
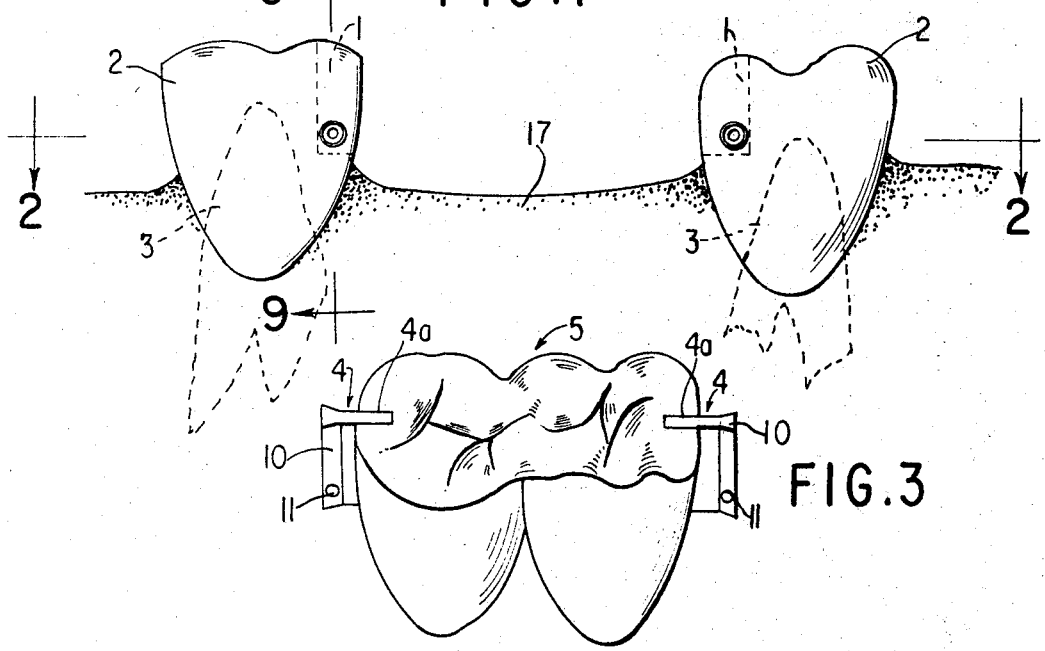
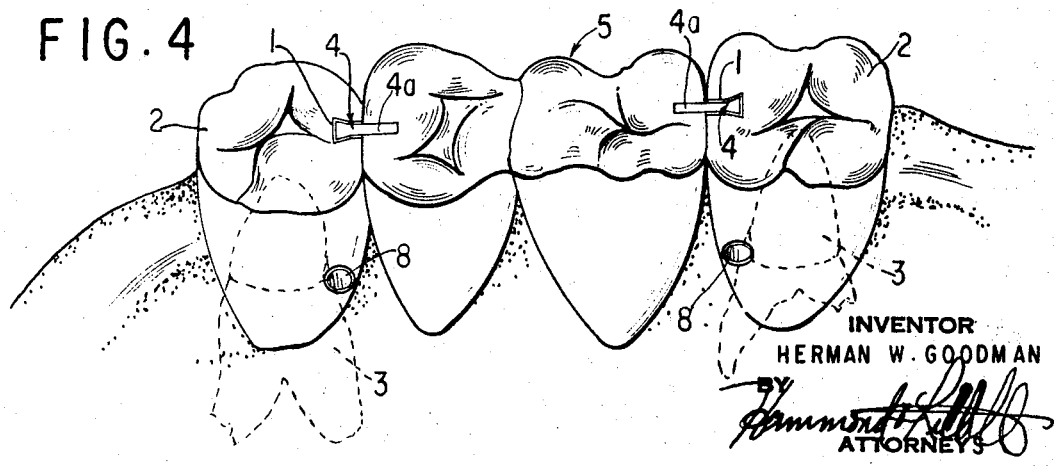

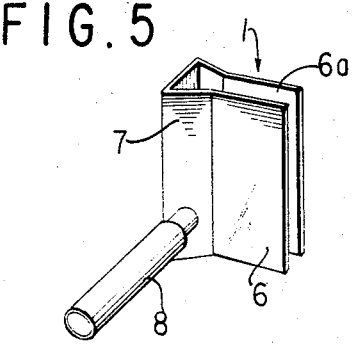
FIG.5
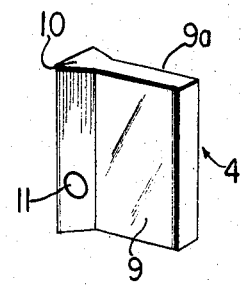
FIG.6
FIG.7
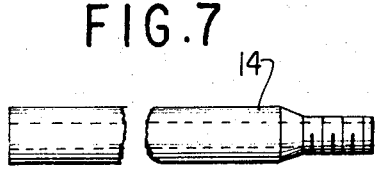
FIG.9
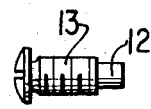
FIG.8
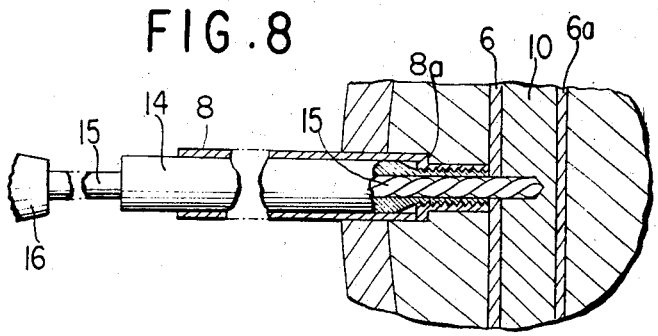
FIG.10
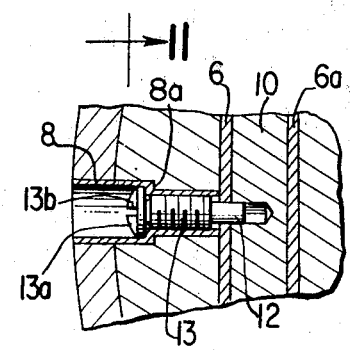
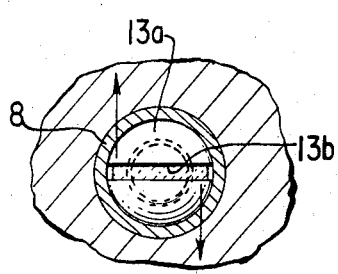
FIG.11

3,442,015
RIGIDLY MOUNTED REMOVABLE FIXED BRIDGE
Herman W. Goodman, late of 333 W. 56th St., New York, N.Y. 10019; Sophie Goodman, executrix of said Herman W. Goodman, deceased
Filed July 25, 1966, Ser. No. 567,601
Int. Cl. A61c 13/22
U.S. Cl. 32—6        11 Claims

ABSTRACT OF THE DISCLOSURE

Describes a rigidly mounted removable fixed bridge for denture wearers in which matching male and female members are provided on the bridge teeth and on the pier teeth and a screw tube and screws hold the bridge firmly in place but permit the bridge teeth to be removed and reinserted in their position between the pier teeth without destroying any portion of the bridge or the pier teeth.

---

Figure 16:
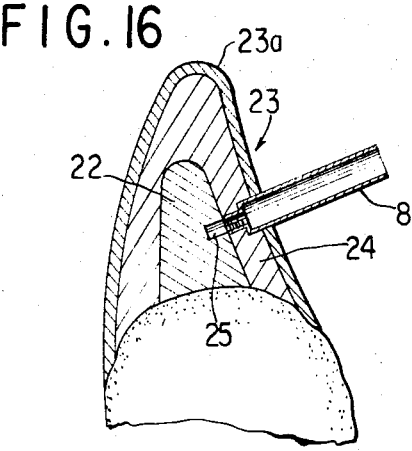

This invention relates to rigidly mounted fixed bridges which may be removed by the dentist and reinstalled in rigid position without the necessity for making a new bridge or any portion thereof.

It is desirable that fixed bridges be rigidly mounted so that they will not change position in the mouth and so that the patient will maintain a firm and uniform bite. However, rigidly mounted fixed bridges occasionally have to be removed because of gum infection or gum irritation below the bridge and for other reasons.

To remove the normal rigidly mounted bridge it is usually necessary for the dentist to cut or otherwise destroy the bridge to remove it. This requires the manufacture of a new bridge at considerable trouble and expense to the patient, as new impressions and new fittings are required to produce a new bridge to take the place of the old bridge. In addition, the crowns on the pier or abutment teeth to which the bridge was anchored have to be removed and this occasionally causes damage to the pier teeth requiring regrinding of these teeth and refitting of the crowns thereon. In some instances where a permanently mounted fixed bridge requires removal, the former pier teeth are so damaged that they must be removed and the nearest adjacent sound teeth made into pier teeth which requires that the new bridge be made longer to span the distance between the new pier teeth and new crowns must be provided for the new pier teeth in addition to the precision work of making and installing a completely new bridge.

One of the objects of my invention is to provide a rigidly mounted fixed bridge which may be removed and reinstalled by the dentist for gum treatment or other reasons without destroying the bridge.

Another object of my invention is to provide a rigidly mounted fixed bridge which may be removed and reinstalled by the dentist without disturbing the crowned portion of the pier or abutment teeth and without requiring further work on the pier teeth to reinstall the bridge.

Another object of the invention is to provide rigidly mounted fixed bridges which are easier to make and install than the present rigidly mounted bridges which are permanently attached to the crown on the pier or abutment teeth.

Various other objects and advantages of my invention will become apparent as this description proceeds.

Figure 17:
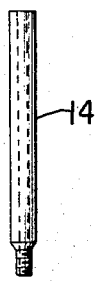
Figure 18:
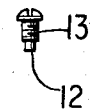
Figure 21:
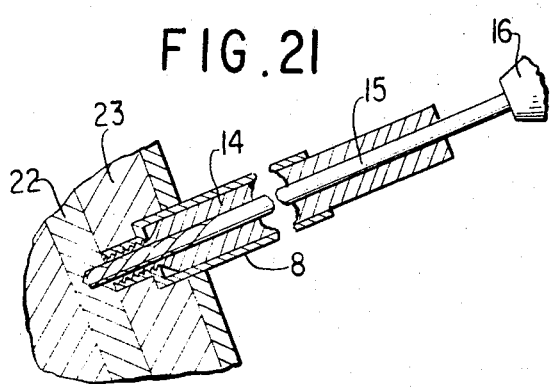
Figure 19:
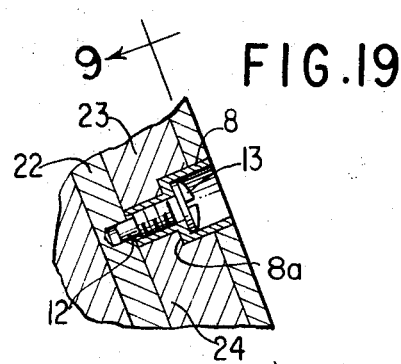
Figure 20:
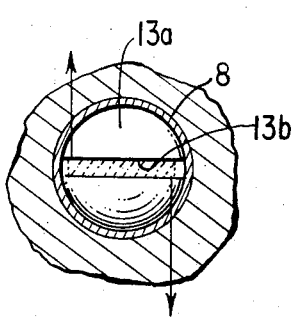

Referring now to the drawings which show several embodiments of my invention,

FIG. 1 is a view from inside the mouth showing two crowned abutment or pier teeth prepared for the reception of a rigidly mounted removable fixed bridge, FIG. 2 is a sectional plan view approximately on the line 2—2 of FIG. 1, FIG. 3 is a perspective view of the bridge which spans the space between the pier teeth shown in FIGS. 1 and 2, FIG. 4 is a perspective view from inside the mouth of the rigidly mounted removable fixed bridge in place between the pier teeth, FIG. 5 is a perspective view of a female member which is mounted in the pier teeth in this embodiment of my invention, FIG. 6 is a perspective view of a male member which is mounted in the terminal teeth of the bridge in this embodiment of my invention, FIG. 7 is a perspective view of the drill jig used to insure accurate registry of the hole in the male member with the screw tube in the female member, FIG. 8 is a sectional view illustrating the drill jig in position and the drilling of the male member, FIG. 9 is a perspective view of a mounting screw used to hold the bridge rigidly in place between the pier teeth, FIG. 10 is a sectional view showing a mounting screw in the position it occupies to hold the male and female members rigidly together, FIG. 11 is a sectional view on the line 11—11 of FIG. 10, FIG. 12 is an exploded perspective view of another embodiment of my invention in which the male members are formed on and project from the crowns on the pier teeth and in which the female members are formed in the casting forming the bridge, FIG. 13 is a view from inside the mouth of the bridge of FIG. 12 mounted in place, FIG. 14 is a sectional view approximately on the line 14—14 of FIG. 13, FIG. 15 is a view similar to FIG. 14 showing the holding screw in place and the protruding end of the screw tube cut off, FIG. 16 is a sectional view sustantially along the line 16—16 of FIG. 13, FIG. 17 is a view of the drill jig used to drill the holes in the male members in this embodiment of the invention, FIG. 18 is a view of the holding screw, FIG. 19 is a sectional view showing the holding screw in position and the end of the screw tube cut off, FIG. 20 is a sectional view along the line 20—20 of FIG. 19 showing how the head of the holding screw is prevented from spreading, and FIG. 21 is a view of the drill jig and drill in position for drilling the securing hole in the male memer.

In the embodiment of my invention illustrated in FIGS. 1 to 11, female members 1 are mounted in the crowned portion 2 of the pier or abutment teeth 3 and male members 4 are mounted in the end teeth of the bridge 5. While only a two tooth bridge is illustrated in FIGS. 1 to 4, it will be understood that the number of teeth in the bridge will vary with the distance to be spanned between the pier teeth.

The female members 1 (FIG. 5) in this embodiment of my invention are preferably made of one piece of precious metal suitable for use in the mouth, such as gold or various dental alloys. The female members 1 have side walls 6 and 6a connected together by a dovetailed slot 7. An internally threaded screw tube 8 of the same metal used for the female members is integrally connected, by welding, soldering or otherwise, into a sloping side of the dovetailed slot 7.

The male members 4 (FIG. 6) are provided with smooth sides 9 and 9a and a dovetailed end 10. The male members are preferably made of one piece of precious metal or of a suitable plastic and when slid downwardly into the female members the sides 9 and 9a (FIG. 6) closely fit between the side walls 6 and 6a of the female members and the dovetailed ends 10 of the male members 4 fit closely in the dovetailed slots 7 of the female members. A hole 11 in the dovetailed end of the male members 4 receives the reduced end portion 12 of a securing screw 13, inserted through the screw tube 8, when the bridge is secured in place as will be described later. The screws 13 are preferably made of stainless steel, but other suitable hard metal may be used.

To install a rigidly mounted removable fixed bridge according to this embodiment of my invention, the pier or abutment teeth 3 are ground down to receive a cap or crown 2 and the female members 1 are mounted in the crowns 2 with the female member in one pier tooth crown exactly parallel with the female member in the opposite pier tooth crown when the crown castings are made. Each female member has a screw tube 8 attached thereto and partially surrounded at the end, adjacent the female member, with the material of which the crown 2 is made. The screw tubes 8 are provided with shoulders 8a against which the heads 13a abut. At each end of the bridge 5 male members 4 are mounted in parallel relation with each other and with the ends 4a imbedded in the casting of the bridge teeth. In the manufacture of this type of denture the dental laboratory technician will then slide the male members 4 at each end of the bridge into the female members 1 in the crowns 2 which have been made according to the impressions furnished by the dentist, and screw the drill jig 14 (FIG. 7) into the screw tubes 8 as illustrated in FIG. 8. A drill bit 15, driven by a suitable drill 16, is inserted through the drill jig and holes 11 are drilled through the side of the female members and into the dovetailed ends of the male members 4. By using a drill jig screwed into the screw tube 8, to guide the drill bit 15, accurate registry of the holes 11 with the center line of the screw tubes 8 is assured, and by mounting the screw tubes 8 on the side of the dovetailed slots 7 so that the holes 11 are drilled into an angled portion of the dovetails 10, when the holding screws 13 are later inserted through the screw tubes 8 and into the holes 11, the bridge 5 and the adjacent pier teeth are firmly secured together in the patient's mouth.

After the holes 11 have been drilled as described, the drill bit 15 is withdrawn, the drill jig 14 is unscrewed from the screw tube 8 and the screw tubes are preferably retapped to assure that the threads are in good condition and screws 13 are inserted in the screw tubes 8, as illustrated in FIG. 10 with the reduced ends or dog points 12 of the screws 13 projecting into the holes 11 of the male members 4 to hold the bridge 5 and the crowns 2 together, and the projecting ends of the screw tubes 8 are ground off even with the outer wall of the crowns 2. At this point the removable fixed bridge 5 and the attached crowns 2 are ready to be delivered to the dentist.

When the dentist receives the assembled crowns 2 and bridge 5 he withdraws the ends of screws 13 from the holes 11 to enable him to separate the crowns 2 from the bridge. It is not necessary for the dentist to remove the screws 13 from the screw tubes 8, but only to unscrew them far enough to remove the ends 12 from the holes 11. He then mounts crowns 2 on the pier teeth 3, which have been previously prepared to receive the crowns, and cements the crowns in position on the pier teeth. He then slides the male members 4 projecting from each end of the bridge 5 into the female members 1 in the crowned teeth 3 and tightens the screws 13 to fix the bridge firmly in place with the base of the bridge 5 firmly contacting the gum line 17. The holes in the exposed ends of the ground off screw tubes 8 may be filled with any suitable material, such as gum or gutta percha, so that the crowned teeth have a smooth surface and the patient will not feel any depression where the screw tubes are installed.

The bridge 5 when installed in the manner described, will be firmly anchored in the patient's mouth and will provide a firm biting surface and perform the functions of normal teeth. If, however, food lodges below the bridge or the gums become infected or irritated, or it becomes necessary for any reason to remove the bridge, the dentist can do so by removing the gutta percha packing from the screw tubes 8, unscrewing the ends 12 of the screws 13 from the holes 11 in the male members and sliding the bridge upward or downward, depending upon whether it is located in the lower or upper jaw, to remove the male members 4 from the female members 1. It is not necessary to remove the screws 13 from the screw tubes 8 so that the same screw will always go back into the same hole 11. After the required treatment the fixed bridge 5 may be reinstalled and firmly anchored in place in the manner previously described.

As the heads 13a of screws 13 are closely surrounded by the walls of the screw tube 8 the screw slots 13b are prevented from spreading so that even if the screws 13 are made of a soft metal a good slot for the reception of a screw driver for advancing or retarding the screws 13 is always assured. The heads 13a abut against the shoulders 8a in the screw tubes 8 and any holding strain is put upon the shoulders 8a and screw heads 13a rather than on the screw threads. While the screw tubes 8 and screws 13 have been illustrated as being inserted in the back of the abutment teeth, they may be mounted in the front of the abutment teeth, especially if the abutment teeth are toward the back of the patient's mouth.

In the embodiment of my invention illustrated in FIGS. 12 to 21 inclusive, the same principle is used, but the position of the male and female members are reversed and the female members are not formed as a separate part but are formed in the casting from which the bridge is formed.

As shown in FIG. 12, the pier or abutment teeth 20 are ground down and provided with caps 21 and each cap is provided with an integral portion or wing 22 protruding into the space to be occupied by the bridge 23. The wings 22 constitute the male members in this embodiment and the female members 24 are formed in the casting forming the bridge, in making the bridge casting.

Screw tubes 8, formed of the same metal as the bridge casting, are mounted in the female members 24 at each end of the bridge during the casting of the bridge 23. The bridge casting 23 and the crowns 21 may be provided with jackets of porcelain or plastic 23a to match the color of the patient's teeth, as is the practice in the trade. Crowns 2 and bridges 4 are also provided with the porcelain or plastic jackets.

After the crowns or caps 21 for the pier teeth 20 have been formed with the wings or male members 22 projecting therefrom, the bridge 23 and the crowns are assembled together by sliding the female members 24 over the male members 22. The male members and the female members are provided with correspondingly beveled sides so that they will fit firmly together. When in assembled position drill jigs 14 are screwed into the screw tubes 8 and holes 25 are drilled into the male members 22 on the same angle as the screw tubes 8 and in the manner previously described in connection with FIG. 8. The holes 25 and also the holes 11 may be drilled into or through the male members 22 and 10 and in all instances must be drilled for enough to receive the dog points 12 of the screws 13. The drills 15 are removed and the drill jigs unscrewed from the screw tubes 8, the screw tubes are retapped, screws 13 are inserted and screwed firmly into place and the protruding ends of screw tubes 8 are cut or ground off. The screw tubes 8 are preferably mounted at 90° to the side walls of the beveled female members 24.

The wings 22 may be provided with tapered sides as illustrated at the left pier tooth in FIG. 12 or with relatively straight side walls as illustrated at the right side of FIG. 12 and in either case the female members 24 will be provided with side walls which conform to the side walls of the male members. Tapered side walls are usually preferred, as this permits the screw tubes 8 to be given an upward slope as shown at the right of FIG. 13. The upwardly sloping screw tubes are more accessible for manipulation of the screws 13 than the horizontal screw tubes.

When the dentist receives the assembled bridge illustrated in FIGS. 12 to 15, he withdraws the points 12 of screws 13 from the male members, without withdrawing the screws 13 from the screw tubes 8, and separates the crowns 21 from the bridge 23. The crowns 21 are then cemented in place on the pier teeth 20 and the bridge 23 installed by sliding the female members 24 downwardly or upwardly on the wings or male members 22, depending upon whether the bridge has been made for the lower or upper portion of the mouth. When the bridge is firmly in place between the pier teeth, the screws 13 are turned inwardly to move the dog points 12 into the holes 25 to hold the bridge firmly in place and the holes in the screw tubes 8 are sealed with gum, gutta percha, or the like.

This bridge will remain firmly in place in the patient's mounth, but can be removed and reinstalled by the dentist as previously described in connection with FIGS. 1 to 11, by unscrewing screws 13 to remove the points 12 from the holes 25.

It is possible, and in some cases it may be desirable, to provide one end of a bridge with male and female members as illustrated and described in FIGS. 1 to 11, and the other end with male and female members as illustrated and described in FIGS. 12 to 20.

By using the drill jigs 14, screwed into the screw tubes 8, accurate guidance of the drills 15 is assured and the holes drilled through the walls of the female members and into the male members are in perfect registry, so that when the screws 13 are inserted into the screw tubes and the points 12 moved into the registering holes in the female and male members, the bridge is firmly mounted in the desired position between the crowned pier teeth and will not move in any direction. It can, however, be removed, as previously described, by the dentist when he has unscrewed the screws 13.

While I have described preferred embodiments of my invention it will be understood that variations may be made therein, and will be made in practice in making and installing rigidly mounted removable fixed bridges as described herein.

I claim:

1. A rigidly mounted removable fixed bridge comprising a pair of crowned abutment teeth and a removable fixed bridge spanning the space between said abutment teeth, male and female members connecting said bridge and said abutment teeth, and internally threaded screw tubes having shoulders adjacent the end of the screw threaded portion rigidly connected to each of said female members, said male members having a hole therein registering with the end of said screw tubes and a retractable screw in said screw tubes having a point adapted to be moved into and out of the hole in said male members and a head contacting said shoulders in the screw tube to secure the bridge rigidly in place between said abutment teeth and to permit removal of said bridge.

2. The bridge according to claim 1 in which the female members are mounted in the crowns of said abutment teeth and the male members are mounted in the ends of said bridge.

3. The bridge according to claim 2 in which the female members are dovetailed slots in the crowns of said abutment teeth and the male members are correspondingly dove-tailed projections from said bridge.

4. The fixed bridge according to claim 3 in which the screw tubes are connected to a sloping side of said dove-tailed slots and the holes in said male members are located in a corresponding sloping wall of the male members.

5. The fixed bridge according to claim 1 in which the male members are mounted on the crowns of said abutment teeth and the female members are formed in the casting for the terminal teeth of said bridge.

6. The bridge according to claim 5 in which the male members are formed with beveled sides and the female members are formed with correspondingly beveled sides to fit upon said male members.

7. The bridge according to claim 6 in which the screw tubes are mounted in the female members at substantially 90° to a beveled side of the female members and in which the hole in the male members is at the same angle as the corresponding screw tube.

8. The method of providing a rigidly mounted removable fixed bridge between the pier teeth of said bridge, which comprises providing the crowns for the pier teeth and the removable bridge with matching male and female members, providing the female members with internally threaded screw tubes, assembling the crowns and bridge together with the male and female members fitting each other, screwing a drill jig into the screw tubes, drilling a hole into said male and female members through said drill jig, removing the drill jig and inserting holding screws through said screw tubes and into the holes drilled into said male and female members.

9. The method of claim 8 in which the screw threads in the screw tubes ar retapped after removal of the drill jig.

10. The method of claim 9 in which the screw tubes are cut off even with the outer side of said female members.

11. The method of claim 8 in which the screw tubes are provided with shoulders adjacent the screw threaded portions and the holding screws are provided with heads and in which the heads of the holding screws are screwed against said shoulders.

References Cited

UNITED STATES PATENTS

| | | | |
|---|---|---|---|
| 1,008,028 | 11/1911 | Gollobin et al. | 32—5 |
| 1,211,494 | 1/1917 | Shaw | 32—6 |
| 1,471,754 | 10/1923 | Rosenblum | 32—6 |
| 2,605,546 | 8/1952 | Darcissac | 32—6 |
| 3,117,377 | 1/1964 | Poveromo | 32—6 |

ROBERT PESHOCK, *Primary Examiner.*